United States Patent
Sun et al.

(10) Patent No.: US 9,248,755 B2
(45) Date of Patent: Feb. 2, 2016

(54) METHOD AND SYSTEM FOR CHARGING ELECTRIC VEHICLES IN AGGREGATION

(71) Applicant: Tsinghua University, Beijing (CN)

(72) Inventors: Hongbin Sun, Beijing (CN); Qinglai Guo, Beijing (CN); Boming Zhang, Beijing (CN); Wenchuan Wu, Beijing (CN); Zhengshuo Li, Beijing (CN); Shujun Xin, Beijing (CN)

(73) Assignee: Tsinghua University, Beijing (CN)

( * ) Notice: Subject to any disclaimer, the term of this patent is extended or adjusted under 35 U.S.C. 154(b) by 186 days.

(21) Appl. No.: 14/072,203

(22) Filed: Nov. 5, 2013

(65) Prior Publication Data

US 2014/0125280 A1     May 8, 2014

(30) Foreign Application Priority Data

Nov. 5, 2012   (CN) .......................... 2012 1 0436564

(51) Int. Cl.

| H02J 7/00 | (2006.01) |
|---|---|
| H02J 7/14 | (2006.01) |
| H02J 7/06 | (2006.01) |
| B60L 11/18 | (2006.01) |

(52) U.S. Cl.
CPC .......... *B60L 11/184* (2013.01); *B60L 11/1844* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ... B60L 11/184; B60L 11/1842; Y02T 90/14; Y02T 90/128; Y02T 90/163; Y04S 10/126
USPC .................................. 320/101, 104, 109, 158
See application file for complete search history.

(56) References Cited

U.S. PATENT DOCUMENTS

| 2004/0238243 | A1* | 12/2004 | King et al. .................... 180/65.2 |
|---|---|---|---|
| 2009/0253898 | A1* | 10/2009 | Engl et al. ...................... 530/350 |
| 2011/0015799 | A1* | 1/2011 | Pollack et al. ................. 700/291 |
| 2012/0133337 | A1* | 5/2012 | Rombouts et al. ............ 320/155 |
| 2012/0280653 | A1* | 11/2012 | Prosser et al. ................. 320/109 |
| 2013/0054045 | A1* | 2/2013 | Ramezani et al. ............ 700/297 |
| 2013/0278225 | A1* | 10/2013 | Dietze et al. .................. 320/137 |
| 2013/0307466 | A1* | 11/2013 | Frisch et al. .................. 320/106 |

(Continued)

OTHER PUBLICATIONS

English translation of Chinese Office Action dated Apr. 21, 2014 for Chinese Patent Application No. 201210436564.0.

*Primary Examiner* — Helen Rossoshek
(74) *Attorney, Agent, or Firm* — David D. Brush; Westman, Champlin & Koehler, P.A.

(57) ABSTRACT

Method and system for charging electric vehicles in an aggregation is provided. The method includes: obtaining a plurality of first charge power curves of a plurality of electric vehicles in the aggregation; obtaining a coordinating information of each of the plurality of electric vehicles from the plurality of first charge power curves; obtaining a first feedback charge power curve of each of the plurality of electric vehicles from the coordinating information and a charging cost curve of each of the plurality of electric vehicles; judging whether the first feedback charge power curve is same with the first charge power curve of each of the plurality of electric vehicles; if yes, charging each of the plurality of electric vehicles in accordance with the first charge power curve.

8 Claims, 2 Drawing Sheets

(56) References Cited

U.S. PATENT DOCUMENTS

| | | | |
|---|---|---|---|
| 2014/0062401 A1* | 3/2014 | Gadh et al. | 320/109 |
| 2014/0184165 A1* | 7/2014 | Takahashi et al. | 320/134 |
| 2014/0217993 A1* | 8/2014 | Rousselle et al. | 320/157 |
| 2014/0253037 A1* | 9/2014 | Yano et al. | 320/109 |

\* cited by examiner

METHOD AND SYSTEM FOR CHARGING ELECTRIC VEHICLES IN AGGREGATION

CROSS-REFERENCE TO RELATED APPLICATION

This application claims priority to and benefits of Chinese Patent Application Serial No. 201210436564, filed with the State Intellectual Property Office of P. R. China on Nov. 5, 2012, the entire content of which is incorporated herein by reference.

FIELD

The present disclosure relates to a power system operation and control field, and more particularly to a method for charging electric vehicles in an aggregation and a system for charging electric vehicles in an aggregation.

BACKGROUND

The electric vehicles parked in the same park lot or the same residential community are referred to be in an aggregation. The aggregation of electric vehicles is managed as a whole to be charged. The charging power of each electric vehicle is controlled so that the electric vehicle is charged properly and at the same time does not influence the power grid much. For example, the charging power may be increased during the trough of the power grid and may be decreased during the peak of the power grid.

SUMMARY

According to a first aspect of the present disclosure, a method for charging electric vehicles in an aggregation is provided. The method comprising steps of: S1, obtaining a plurality of first charge power curves of a plurality of electric vehicles in the aggregation; S2, obtaining a coordinating information of each of the plurality of electric vehicles from the plurality of first charge power curves; S3, obtaining a first feedback charge power curve of each of the plurality of electric vehicles from the coordinating information and a charging cost curve of each of the plurality of electric vehicles; S4, judging whether the first feedback charge power curve is same with the first charge power curve of each of the plurality of electric vehicles; S5, if yes, charging each of the plurality of electric vehicles in accordance with the first charge power curve; S6, if no, obtaining an iterative step of each of the plurality of electric vehicles from the first feedback charge power curve and the first charge power curve; S7, judging whether the iterative step is 0; S8, if yes, charging each of the plurality of electric vehicles in accordance with the first charge power curve; and S9, if no, obtaining a second charge power curve of each of the plurality of electric vehicles from the first feedback charge power curve, the iterative step, and the first charge power curve, and repeating steps S2 to S9 in accordance with the second charge power curve.

In one embodiment of the present disclosure, step S2 comprises: obtaining the coordinating information of each of the plurality of electric vehicles from the plurality of first charge power curves and a plurality of ideal charge power curves according to formula (1), $$\Delta_i^{m-1} = \sum_{j=1, j \neq i}^{N} P_j^{m-1} - D \quad (1)$$

where $\Delta_i^{m-1}$ is the coordinating information of the i-th electric vehicle, $P_j^{m-1}$ is the first charge power curve of the i-th electric vehicle, D is an ideal charge power curve of the aggregation, N is a number of electric vehicles in the aggregation, m is an iterative time, i, j and m are positive integers greater than 0.

In one embodiment of the present disclosure, step S3 comprises: obtaining a first optimal solution of a first quadratic programming according to formula (2), and the first optimal solution is the first feedback charge power curve of each of the plurality of electric vehicles, $$\min_{P_i^{m*}(0), \ldots, P_i^{m*}(T-1)} \omega_1 \sum_{k=0}^{T-1} (P_i^{m*}(k) + \Delta_i^{m-1}(k))^2 + \omega_2 \sum_{k=0}^{T-1} c_i(k) P_i^{m*}(k) \quad (2)$$

$$\text{s.t.} \quad g_i(P_i^{m*}(0), \ldots, P_i^{m*}(T-1)) \geq 0$$

where $\omega_1$ and $\omega_2$ are weight coefficients, $P_i^{m*}$ is the first feedback charge power curve of the i-th electric vehicle, $c_i$ is the charging cost curve of the i-th electric vehicle, k is a time period, the first feedback charge poser curve of the i-th electric vehicle, the coordinating information of the i-th electric vehicle, and the charging cost curve of the i-th electric vehicle respectively comprises a plurality of components on the time period 0 to the time period k, and $g_i(P_i^{m*}(0), \ldots, P_i^{m*}(T-1)) \geq 0$ is a first constraint condition of the first quadratic programming.

In one embodiment of the present disclosure, step S6 comprises: obtaining a second optimal solution of a second quadratic programming according to formula (3), and the second optimal solution is the iterative step of each of the plurality of electric vehicles, $$\min_{\lambda_1^m, \ldots, \lambda_N^m} \omega_1 \sum_{k=0}^{T-1} \left( \sum_{i=1}^{N} (P_i^{m-1}(k) + \Delta P_i^m(k) \lambda_i^m) - D(k) \right)^2 + \omega_2 \sum_{i=1}^{N} \sum_{k=0}^{T-1} c_i(k)(P_i^{m-1}(k) + \Delta P_i^m(k) \lambda_i^m) \quad (3)$$

$$\text{s.t.} \quad 0 \leq \lambda_i^m \leq 1$$

where $\lambda_i^m$ is the iterative step of the i-th electric vehicle, $0 \leq \lambda_i^m \leq 1$ is a second constraint condition of the second quadratic programming.

In one embodiment of the present disclosure, obtaining the second charge power curve of each of the plurality of electric vehicles from the first feedback charge power curve, the iterative step and the charge power curve according to formula (4), $$P_i^m = P_i^{m-1} + \lambda_i^m \Delta P_i^m \quad (4)$$

where $P_i^m$ is the second charge power curve of the i-th electric vehicle.

In one embodiment of the present disclosure, the step S3 is performed in each of the plurality of electric vehicles.

With the method for charging electric vehicles in an aggregation, by using each of sub-controller of each of the plurality of electric vehicles to solve itself constraint condition of charging, and by using the master controller to solve the feedback information of each of sub-controller, it enables parallel computing, and has a higher efficiency than current technology, also can successfully solve large-scale computing problems in the aggregation of electric vehicles for charging.

With the method for charging electric vehicles in an aggregation, it enables the charge power curve of each of the plurality of electric vehicles to satisfy its own needs when the iteration converges.

Through a large number of calculations, the method has good convergence performance to calculate thousands of electric vehicles in the aggregation, and it converges in less than 5 times. Besides, the total calculation time maintained at about 20 ms.

According to a second aspect of the present disclosure, a system for charging electric vehicles in an aggregation is provided. The system for charging electric vehicles in an aggregation, comprising: a master controller, configured to obtain a plurality of first charge power curves of a plurality of electric vehicles in the aggregation, and to obtain a coordinating information of each of the plurality of electric vehicles from the plurality of first charge power curves; a plurality of sub-controllers, each sub-controller is installed in each of the plurality of electric vehicles, each sub-controller is configured to obtain a first feedback charge power curve of each of the plurality of electric vehicles from the coordinating information and a charging cost curve of each of the plurality of electric vehicles; the master controller is also configured to: judge whether the first feedback charge power curve is same with the first charge power curve of each of the plurality of electric vehicles; if yes, charge each of the plurality of electric vehicles in accordance with the first charge power curve; if no, obtain an iterative step of each of the plurality of electric vehicles from the first feedback charge power curve and the first charge power curve; judge whether the iterative step is 0; if yes, charge each of the plurality of electric vehicles in accordance with the first charge power curve; and if no, obtain a second charge power curve of each of the plurality of electric vehicles from the first feedback charge power curve, the iterative step, and the charge power curve.

In one embodiment of the present disclosure, the master controller is configured to: obtain the coordinating information of each of the plurality of electric vehicles from the plurality of first charge power curves and a plurality of ideal charge power curves according to formula (1), $$\Delta_i^{m-1} = \sum_{j=1, j \neq i}^{N} P_j^{m-1} - D \quad (1)$$

where $\Delta_i^{m-1}$ is the coordinating information of the i-th electric vehicle, $P_j^{m-1}$ is the first charge power curve of the i-th electric vehicle, D is an ideal charge power curve of the aggregation, N is a number of electric vehicles in the aggregation, m is an iterative time, i, j and m are positive integers greater than 0.

In one embodiment of the present disclosure, each sub-controller is configured to: obtain a first optimal solution of a first quadratic programming as according to formula (2), and the first optimal solution is the first feedback charge power curve of each of the plurality of electric vehicles, $$\min_{P_i^{m^*}(0), \ldots, P_i^{m^*}(T-1)} \omega_1 \sum_{k=0}^{T-1} (P_i^{m^*}(k) + \Delta_i^{m-1}(k))^2 + \omega_2 \sum_{k=0}^{T-1} c_i(k) P_i^{m^*}(k) \quad (2)$$

s.t. $g_i(P_i^{m^*}(0), \ldots, P_i^{m^*}(T-1)) \geq 0$ where $\omega_1$ and $\omega_2$ are weight coefficients, $P_i^{m^*}$ is the first feedback charge power curve of the i-th electric vehicle, $c_i$ is the charging cost curve of the i-th electric vehicle, k is a time period, the first feedback charge power curve of the i-th electric vehicle, the coordinating information of the i-th electric vehicle, and the charging cost curve of the i-th electric vehicle respectively comprises a plurality of components on the time period 0 to the time period k, and $g_i(P_i^{m^*}(0), \ldots, P_i^{m^*}(T-1)) \geq 0$ is a first constraint condition of the first quadratic programming.

In one embodiment of the present disclosure, each sub-controller is configured to: obtain a second optimal solution of a second quadratic programming as according to formula (3), and the second optimal solution is the iterative step of each of the plurality of electric vehicles, $$\min_{\lambda_1^m, \ldots, \lambda_N^m} \omega_1 \sum_{k=0}^{T-1} \left( \sum_{i=1}^{N} (P_i^{m-1}(k) + \Delta P_i^m(k)\lambda_i^m) - D(k) \right)^2 + \omega_2 \sum_{i=1}^{N} \sum_{k=0}^{T-1} c_i(k)(P_i^{m-1}(k) + \Delta P_i^m(k)\lambda_i^m) \quad (3)$$

s.t. $0 \leq \lambda_i^m \leq 1$ where $\lambda_i^m$ is the iterative step of the i-th electric vehicle, $0 \leq \lambda_i^m \leq 1$ is a second constraint condition of the second quadratic programming.

In one embodiment of the present disclosure, each sub-controller is configured to obtain the second charge power curve of each of the plurality of electric vehicles from the first feedback charge power curve, the iterative step and the charge power curve according to following formula (4), $$P_i^m = P_i^{m-1} + \lambda_i^m \Delta P_i^m \quad (4)$$

where $P_i^m$ is the second charge power curve of the i-th electric vehicle.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
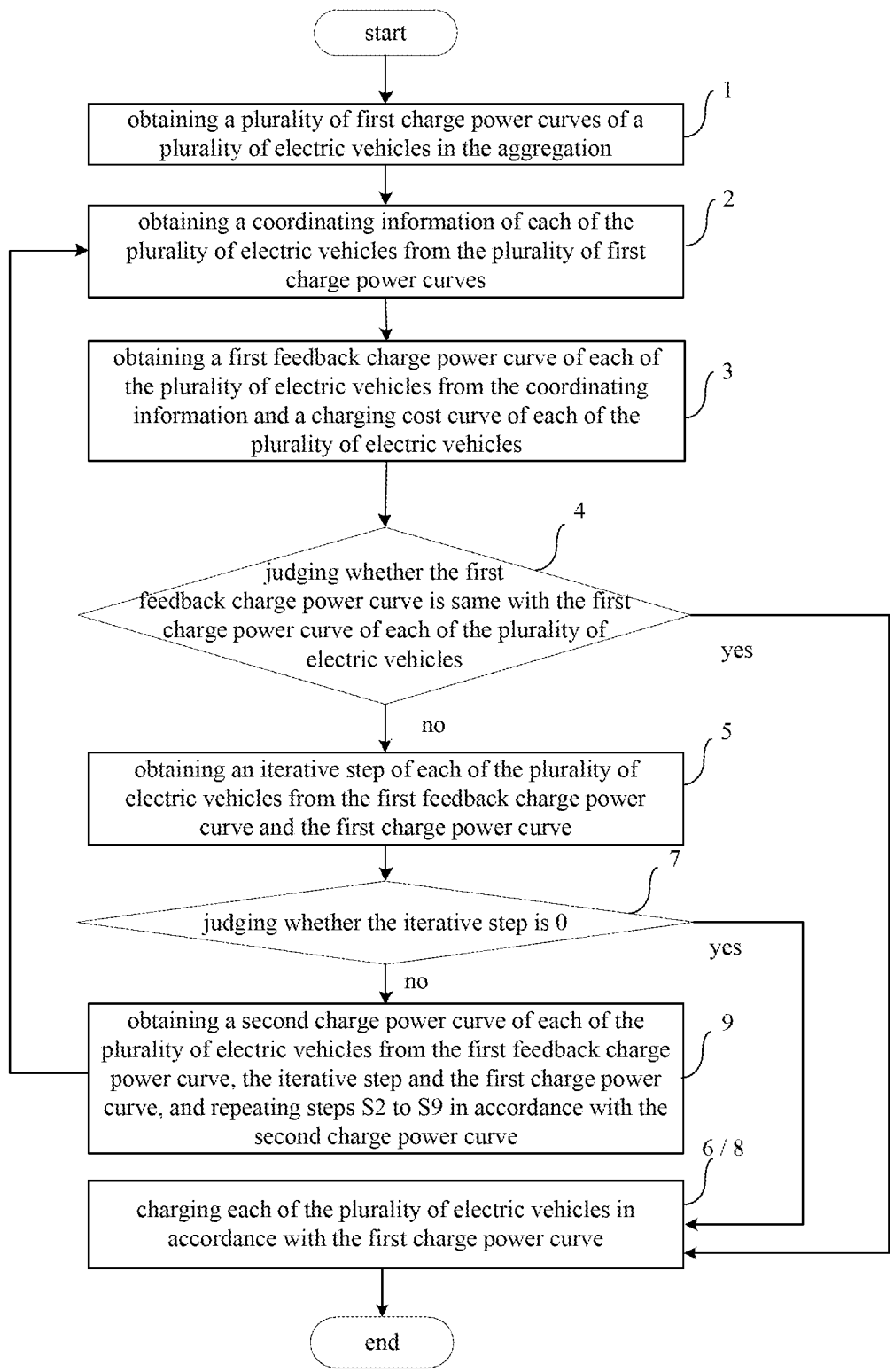
FIG. 1 is a flow char of a method for charging electric vehicles in an aggregation according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship in which structures are secured or attached to one another either directly or indirectly through intervening structures, as well as both movable or rigid attachments or relationships, unless expressly described otherwise.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation.

In addition, terms such as "first" and "second" are used herein for purposes of description and are not intended to indicate or imply relative importance or significance.

In the description, unless specified or limited otherwise, it is to be understood that phraseology and terminology used herein with reference to device or element orientation (for example, terms like "upper", "lower", and the like) should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the following, method and system for charging electric vehicles in an aggregation according to embodiments of the present disclosure will be described in detail with reference to drawings.

In the present disclosure, the master controller is installed in the park lot or the residential community, and a plurality of sub-controllers is respectively installed in a plurality of electric vehicles in the aggregation. The master controller is communicating with each of sub-controllers to control each of electric vehicles for charging.

The charging power of each electric vehicle is controlled so that the electric vehicle is charged properly and at the same time does not influence the power grid much. Also, the charging cost must be lower. That is expressed according to formula (1):

$$E_i(k+1)=E_i(k)+P_i(k)\Delta t \; k=0,\ldots,T-1 \, (a)$$

$$\underline{E}_i(k) \leq E_i(k) \leq \tilde{E}_i(k) \; k=1,\ldots,T-1 \, (b)$$

$$\underline{P}_i(k) \leq P_i(k) \leq \tilde{P}_i(k) \; k=0,\ldots,T-1 \, (c)$$

$$E_i(0)=E_i^O, E_i(T)=E_i^T \, (d) \qquad (1)$$

where $E_i(k)$ is an battery energy storage of the i-th electric vehicle in the k-th time period, $P_i(k)$ is an charge power of the i-th electric vehicle in the k-th time period, $\underline{E}_i(k)$ is a lower limit of $E_i(k)$, $\tilde{E}_i(k)$ is a upper limit of $E_i(k)$, $\underline{P}_i(k)$ is a lower limit of $P_i(k)$, $\tilde{P}_i(k)$ is a upper limit of $P_i(k)$. $\tilde{E}_i(k)$, $\underline{E}_i(k)$, $\underline{P}_i(k)$, $\tilde{P}_i(k)$ is collected by the sub-controller at the beginning of the process of charging; $E_i^O$ is an battery energy storage of the i-th electric vehicle at the beginning time for charging, $E_i^T$ is an battery energy storage of the i-th electric vehicle at the end time for charging, $E_i^O$ and $E_i^T$ are determined by user of each of electric vehicles; $\Delta t$ is a time step, T is a number of time periods, for example, if the total time of charging for each of electric vehicles is 8 hour, $\Delta t$ is 1 hour, then T is 8 hour.

The formula (1) (a) shows a relationship between charge power and energy; The formula (1) (b) shows a first constraint condition of the battery energy storage, The formula (1) (c) shows a constraint condition of the charge power, The formula (1) (d) shows a second constraint condition of the battery energy storage by user. That is expressed according to formula (2):

$$g_i(P_i(1),\ldots,P_i(T-1)) \geq 0 \qquad (2)$$

where $g_i(\bullet) \geq 0$ is a multiple linear vector-valued function of the i-th electric vehicle. The dimension of the multiple linear vector-valued function is $t_i$.

The control objective of the master control is to allow each of electric vehicles to charge in the constraint condition as above-mentioned, but also is beneficial to the power grid. Since the power grid is usually only interested in a total beneficial charge power curve (can be called as "ideal charge power curve"), and thus, the master control only needs to control a total charge power of electric vehicles in the aggregation to be close to or equal to the ideal charge power curve. That is expressed according to formula (3):

$$\min f_1 = \sum_{k=0}^{T-1}\left(\sum_{i=1}^{N} P_i(k) - D(k)\right)^2 \qquad (3)$$

where D(k) is an ideal charge power at the time period k, D is an ideal charge power curve comprising of the ideal charge powers from the time period 0 to the time period k, N is a number of electric vehicles in the aggregation.

Besides, the charging cost must be lower, that is expressed according to formula (4):

$$\min f_2 = \sum_{i=1}^{N}\sum_{k=0}^{T-1} c_i(k) P_i(k) \qquad (4)$$

where $c_i(k)$ is charging cost curve of the i-th electric vehicle at the time period k.

So, optimizing charge power of each of electric vehicles in the aggregation is expressed according to formula (5):

$$\min f = \omega_1 f_1 + \omega_2 f_2$$

$$\text{s.t. } g_i(P_i(0),\dots,P_i(T-1)) \geq 0, \; i=1,\dots,N \qquad (5)$$

where $\omega_1$ and $\omega_2$ are weight coefficients.

The embodiment of the present invention is to solve the above problems. FIG. 1 is a flow char of a method for charging electric vehicles in an aggregation according to an embodiment of the present disclosure. As shown in FIG. 1, the method comprises the following steps.

In step 1, a plurality of first charge power curves of a plurality of electric vehicles in the aggregation is obtained.

In one embodiment, each of the plurality of electric vehicles uses its own sub-controller to initialize the first charge power curve which satisfies its own needs. Then, each of the plurality of electric vehicles uses its own sub-controller to send the first charge power curve to the master controller so that the master controller obtains the plurality of charge power curves of the plurality of electric vehicles in the aggregation.

In step 2, a coordinating information of each of the plurality of electric vehicles from the plurality of first charge power curves is obtained.

In one embodiment, the coordinating information of each of the plurality of electric vehicles from the plurality of first charge power curves and a plurality of ideal charge power curves is obtained according to formula (6), $$\Delta_i^{m-1} = \sum_{j=1, j\neq i}^{N} P_j^{m-1} - D \qquad (6)$$

where $\Delta_i^{m-1}$ is the coordinating information of the i-th electric vehicle, $P_j^{m-1}$ is the first charge power curve of the i-th electric vehicle, D is an ideal charge power curve of the aggregation, N is a number of electric vehicles in the aggregation, m is an iterative time, i, j and m are positive integers greater than 0.

In step 3, a first feedback charge power curve of each of the plurality of electric vehicles from the coordinating information and a charging cost curve of each of the plurality of electric vehicles is obtained.

In one embodiment, the coordinating information of each of the plurality of electric vehicles is obtained in the master controller, and then, the master controller sends the coordinating information of each of the plurality of electric vehicles to each sub-controller. Each sub-controller obtains the first feedback charge power curve from its own coordinating information and the charging cost curve.

Besides, the charging cost curve is determined by the user of each of the plurality of electric vehicles.

In one embodiment, a first optimal solution of a first quadratic programming according to formula (7) is obtained, and the first optimal solution is the first feedback charge power curve of each of the plurality of electric vehicles, $$\min_{P_i^{m*}(0),\dots,P_i^{m*}(T-1)} \omega_1 \sum_{k=0}^{T-1}(P_i^{m*}(k)+\Delta_i^{m-1}(k))^2 + \omega_2 \sum_{k=0}^{T-1} c_i(k) P_i^{m*}(k) \qquad (7)$$

$$\text{s.t. } g_i(P_i^{m*}(0),\dots,P_i^{m*}(T-1)) \geq 0$$

where $\omega_1$ and $\omega_2$ are weight coefficients, $P_i^{m*}$ is the first feedback charge power curve of the i-th electric vehicle, $c_1$ is the charging cost curve of the i-th electric vehicle, k is a time period, the first feedback charge power curve of the i-th electric vehicle, the coordinating information of the i-th electric vehicle, and the charging cost curve of the i-th electric vehicle respectively comprises a plurality of components on the time period 0 to the time period k, and $g_i(P_i^{m*}(0),\dots,P_i^{m*}(T-1)) \geq 0$ is a first constraint condition of the first quadratic programming.

All of variables and parameters are known except $P_i^{m*}$, the method for solving the first quadratic programming is conventional.

In step 4, it is judged whether the first feedback charge power curve is same with the first charge power curve of each of the plurality of electric vehicles.

In one embodiment, iteration direction $\Delta P_i^m$ is obtained from $P_i^{m*}$ and $P_i^{m-1}$ according to formula: $\Delta P_i^m = P_i^{m*} - P_i^{m-1}$, then it is judged $\Delta P_i^m$ is 0 as judged whether the first feedback charge power curve is same with the first charge power curve of each of the plurality of electric vehicles.

In step 5, if yes, each of the plurality of electric vehicles is charged in accordance with the first charge power curve.

In step 6, if no, an iterative step of each of the plurality of electric vehicles from the first feedback charge power curve and the first charge power curve is obtained.

In one embodiment, a second optimal solution of a second quadratic programming according to formula (8) is obtained, and the second optimal solution is the iterative step of each of the plurality of electric vehicles, $$\min_{\lambda_1^m,\dots,\lambda_N^m} \omega_1 \sum_{k=0}^{T-1}\left(\sum_{i=1}^{N}(P_i^{m-1}(k)+\Delta P_i^m(k)\lambda_i^m) - D(k)\right)^2 + \qquad (8)$$

$$\omega_2 \sum_{i=1}^{N}\sum_{k=0}^{T-1} c_i(k)(P_i^{m-1}(k)+\Delta P_i^m(k)\lambda_i^m)$$

$$\text{s.t. } 0 \leq \lambda_i^m \leq 1$$

where $\lambda_i^m$ is the iterative step of the i-th electric vehicle, $0 \leq \lambda_i^m \leq 1$ is a second constraint condition of the second quadratic programming.

In step 7, it is judged whether the iterative step is 0.

In step 8, if yes, each of the plurality of electric vehicles is charged in accordance with the first charge power curve.

In step 9, if no, a second charge power curve of each of the plurality of electric vehicles from the first feedback charge power curve, the iterative step and the first charge power curve is obtained, and steps 2 to 9 is repeated in accordance with the second charge power curve.

In one embodiment, the second charge power curve of the plurality of each of electric vehicles from the first feedback charge power curve, the iterative step and the charge power curve is obtained according to formula (9), $$P_i^m = P_i^{m-1} + \lambda_i^m \Delta P_i^m \qquad (9)$$

where $P_i^m$ is the second charge power curve of the i-th electric vehicle.

With the method for charging electric vehicles in an aggregation, by using each of sub-controller of each of the plurality of electric vehicles to solve itself constraint condition of charging, and by using the master controller to solve the feedback information of each of sub-controller, it enables parallel computing, and has a higher efficiency than current technology, also can successfully solve large-scale computing problems in the aggregation of electric vehicles for charging.

With the method for charging electric vehicles in an aggregation, it enables the charge power curve of each of the plurality of electric vehicles to satisfy its own needs when the iteration converges.

Through a large number of calculations, the method has good convergence performance to calculate thousands of electric vehicles in the aggregation, and it converges in less than 5 times. Besides, the total calculation time maintained at about 20 ms.

With the method for charging electric vehicles in an aggregation, it can achieve to close to or equal to the ideal charge power curve. It is proved as following: optimal approximation of the charging method is same with formula (10) being solvable for $I = \{i | \Delta P_i^\pi \neq 0, \lambda_i^\pi = 0, i = 1, \ldots, N\}$, where $\pi$ is an iteration when the iteration converges.

$$\begin{cases} \dfrac{\theta_i^\pi(k)}{\Delta P_i^\pi(k)} = \left(\dfrac{\partial g_i}{\partial P_i(k)}\right)' \gamma_i, & i \in I, k = 0, \ldots, T-1, \Delta P_i^\pi(k) \neq 0 \\ \sum_{k=0}^{T-1} \theta_i^\pi(k) = \theta_i^\pi \geq 0 \\ \gamma_{i,l} \times g_{i,l}(P_i^\pi) = 0 & l = 1, \ldots, l_i \\ \gamma_{i,l} \geq 0 & l = 1, \ldots, l_i \\ g_{i,l}(P_i^\pi) \geq 0 & l = 1, \ldots, l_i \end{cases} \qquad (10)$$

where $\lambda_i^m$ is a Lagrange Multiplier of formula (9) which is a known quantity, and $\theta_i^\pi(0), \ldots, \theta_i^\pi(T-1), \gamma_{i,1}, \ldots, \gamma_{i,l_i}$ unknown quantities. The number of the unknown quantities is $T+l_i$. $l_i$ is the dimension of $g_i(P_i(1), \ldots, P_i(T-1)) \geq 0$. The number of the constraints of formula (10) is $i_k + 1 + l_i$, where $i_k$ is a number of when $\Delta P_i^\pi(k) \neq 0$. When the iteration converges, $i_k$ is less than T, so the formula (10) is solvable.

For example, there are 5 electric vehicles in the aggregation, and each electric vehicle has to finish charging in the 8 hour. 40 kWh is the upper limit of the battery energy storage, and 0 kWh is the lower limit of the battery energy storage. 20 kWh is the battery energy storage at the beginning time for charging, and the fullest value of battery energy storage is the battery energy storage at the end time for charging. 5 kW is the upper limit of charge power and 0 kW is the lower limit of charge power.

If the time step is 1 hour, the ideal charge power curve and the first charging cost curve of each of time period respectively are D and $c_i$, where D=[12.5, 12.5, 22.5, 12.5, 2.5, 12.5, 12.5, 12.5], $c_i$=[0.5, 0.5, 0.5, 0.5, 0.3, 0.3, 0.3, 0.3,]. Also, set $\omega_1$ and $\omega_2$ respectively being 100 and 1.

(1) Setting m=0. If an initial charge power of each electric vehicle is 2.5 kW, the charge power curve of each electric vehicle $P_i^0$=[2.5, 2.5, 2.5, 2.5, 2.5, 2.5, 2.5, 2.5]. Each electric vehicle using its own sub-controller sends $P_i^0$ to the master controller.

(2) m=1. The coordinating information $\Delta_i^0$ of each vehicle is obtained in the master controller according to formula (6), where $\Delta_i^0$=[−2.5, −2.5, −12.5, −2.5, 7.5, −2.5, −2.5, −2.5]. Then the master controller sends $\Delta_i^0$ to each sub-controller.

(4) $P_i^1*$ is obtained in each sub-controller as according to formula (7), where $P_i^1*$=[2.5, 2.5, 5, 2.5, 0, 2.5, 2.5, 2.5], so $\Delta P_i^1 = P_i^1* - P_i^0$=[0, 0, 2.5, 0, −2.5, 0, 0, 0]. Then each sub-controller sends $\Delta P_i^1$ to the master controller.

(5) The master controller judges $\Delta P_i^m \neq 0$, then the master controller obtained the iterative step $\lambda^1$, orders m=m+1=2, and repeats steps (2).

(6) The master controller judges $\lambda^1 \neq 0$, so, the master controller obtained the second charge power curve of the i-th electric vehicle $P_i^1$=[2.5, 2.5, 4.5, 2.5, 0.5, 2.5, 2.5, 2.5]. Then the master controller orders m=m+1=2, and repeats steps (2).

Following the similar steps, when m=2, the master controller obtains $\Delta_i^1$=[−2.5, −2.5, −4.5, −2.5, −0.5, −2.5, −2.5, −2.5]. It convergences, so the charge power curve of the i-th electric vehicle $P_i$=[2.5, 2.5, 4.5, 2.5, 0.5, 2.5, 2.5, 2.5] for charging.

The present disclosure also provides a system.

Figure 2:
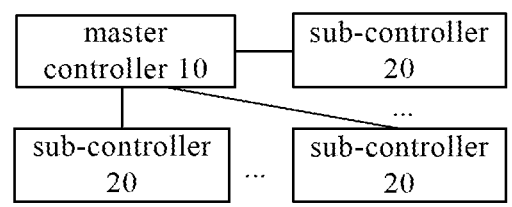
FIG. 2 is block diagram of a system for charging electric vehicles in an aggregation according to an embodiment of the present disclosure.

FIG. 2 is block diagram of a system for charging electric vehicles in an aggregation according to an embodiment of the present disclosure. As show in FIG. 2, the system comprises a master controller 10 and a plurality of sub-controllers 20, each sub-controller 20 is installed in each of the plurality of electric vehicles.

Specifically, the master controller 10 is configured to obtain a first plurality of charge power curves of a plurality of electric vehicles in the aggregation, and to obtain a coordinating information of each of the plurality of electric vehicles from the plurality of first charge power curves.

In one embodiment, each of the plurality of electric vehicles uses its own sub-controller 20 to initialize the first charge power curve which satisfies its own needs. Then, each of the plurality of electric vehicles uses its own sub-controller 20 to send the charge power curve to the master controller 10 so that the master controller 10 obtains the plurality of first charge power curves of the plurality of electric vehicles in the aggregation.

In one embodiment, the master controller 10 is configured to obtain the coordinating information of each of the plurality of electric vehicles from the plurality of first charge power curves and a plurality of ideal charge power curves according to formula (6).

Each sub-controller 20 is configured to obtain a first feedback charge power curve of each of the plurality of electric vehicles from the coordinating information and a charging cost curve of each of the plurality of electric vehicles.

In one embodiment, the coordinating information of each of the plurality of electric vehicles is obtained in the master controller 10, and then, the master controller 10 sends the coordinating information of each of the plurality of electric vehicles to each sub-controller 20. Each sub-controller 20 obtains the first feedback charge power curve from its own coordinating information and the charging cost curve.

Besides, the charging cost curve is determined by the user of each of the plurality of electric vehicles.

In one embodiment, a first optimal solution of a first quadratic programming according to formula (7) is obtained, and the first optimal solution is the first feedback charge power curve of each of the plurality of electric vehicles.

And then, the master controller 10 is also configured to judge whether the first feedback charge power curve is same with the first charge power curve of each of the plurality of electric vehicles. If yes, charge each of the plurality of electric vehicles in accordance with the first charge power curve. If no, the master controller 10 obtains an iterative step of each of the plurality of electric vehicles from the first feedback charge power curve and the first charge power curve.

In one embodiment, a second optimal solution of a second quadratic programming according to formula (8) is obtained, and the second optimal solution is the iterative step of each of the plurality of electric vehicles.

And then the master controller 10 judges whether the iterative step is 0. If yes, charge each of the plurality of electric vehicles in accordance with the first charge power curve. And if no, the master controller 10 obtains a second charge power curve of each of the plurality of electric vehicles from the first feedback charge power curve, the iterative step and the first charge power curve.

In one embodiment, each sub-controller is configured to obtain a second optimal solution of a second quadratic programming according to formula (9), and the second optimal solution is the iterative step of each of the plurality of electric vehicles.

One or more embodiments of the present disclosure solve at least one of the problems existing in the related art to at least some extent.

An embodiment of the present disclosure provides a method for charging electric vehicles in an aggregation, which solves the large-scale computing problems in the aggregation of electric vehicles for charging.

An embodiment of the present disclosure provides a system for charging electric vehicles in an aggregation.

A further embodiment of the present disclosure provides a readable storage medium.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A method for charging electric vehicles in an aggregation, comprising steps of:
by a computer:
S1, obtaining a plurality of first charge power curves of a plurality of electric vehicles in the aggregation;

S2, obtaining coordinating information of each of the plurality of electric vehicles from the plurality of first charge power curves, wherein step S2 comprises:
obtaining the coordinating information of each of the plurality of electric vehicles from the plurality of first charge power curves and a plurality of ideal charge power curves according to formula (1), $$\Delta_i^{m-1} = \sum_{j=1, j \neq i}^{N} P_j^{m-1} - D \tag{1}$$

where $\Delta_i^{m-1}$ is the coordinating information of the i-th electric vehicle, $P_j^{m-1}$ is the first charge power curve of the j-th electric vehicle, D is an ideal charge power curve of the aggregation, N is a number of electric vehicles in the aggregation, m is the number of iterations, i, j and m are positive integers greater than 0;

S3, obtaining a first feedback charge power curve of each of the plurality of electric vehicles from the coordinating information and a charging cost curve of each of the plurality of electric vehicles, wherein step S3 comprises:
obtaining a first optimal solution of a first quadratic programming according to formula (2), and the first optimal solution for the i-th electric vehicle is the first feedback charge power curve of the i-th electric vehicle, $$\min_{P_i^{m*}(0), \ldots, P_i^{m*}(T-1)} \omega_1 \sum_{k=0}^{T-1} (P_i^{m*}(k) + \Delta_i^{m-1}(k))^2 + \omega_2 \sum_{k=0}^{T-1} c_i(k) P_i^{m*}(k) \tag{2}$$

$$\text{s.t. } g_i(P_i^{m*}(0), \ldots, P_i^{m*}(T-1)) \geq 0$$

where $\omega_1$ and $\omega_2$ are weight coefficients, $P_i^{m*}$ is the first feedback charge power curve of the i-th electric vehicle, $c_i$ is the charging cost curve of the i-th electric vehicle, k is a period of time, T is the number of periods of time, the first feedback charge power curve of the i-th electric vehicle, the coordinating information of the i-th electric vehicle, and the charging cost curve of the i-th electric vehicle respectively comprise a plurality of components on the period of time 0 period of time k, and $g_i(P_i^{m*}(0), \ldots, P_i^{m*}(T-1)) \geq 0$ is a first constraint condition of the first quadratic programming, $g_i(\bullet) \geq 0$ is a multiple linear vector-valued function of the i-th electric vehicle, which is denoted as $$E_i(k+1) = E_i(k) + P_i(k)\Delta t \ k = 0, \ldots, T-1 (a)$$

$$\underline{E}_i(k) \leq E_i(k) \leq \tilde{E}_i(k) \ k = 1, \ldots, T-1 (b)$$

$$\underline{P}_i(k) \leq P_i(k) \leq \tilde{P}_i(k) \ k = 0, \ldots, T-1 (c)$$

$$E_i(0) = E_i^0, E_i(T) = E_i^T (d) \tag{1}$$

where $E_i(k)$ is a battery energy storage of the i-th electric vehicle in the k-th period of time, $\underline{E}_i(k)$ is a lower limit of $E_i(k)$, $\tilde{E}_i(k)$ is an upper limit of $E_i(k)$, $\underline{P}_i(k)$ is a lower limit of $P_i(k)$, $\tilde{P}_i(k)$ is an upper limit of $P_i(k)$; $E_i^0$ is a battery energy storage of the i-th electric vehicle at the beginning time for charging, $E_i^T$ is a battery energy storage of the i-th electric vehicle at the end time for charging, Δt is a time difference;

S4, for each of the plurality of electric vehicles, judging whether the first feedback charge power curve of the respective electric vehicle is same as the first charge power curve of the respective electric vehicle;

S5, if yes, charging the respective electric vehicle in accordance with the first charge power curve of the respective electric vehicle;

S6, if no, under the condition that the first feedback charge power curve of the respective electric vehicle is not the same as the first charge power curve of the respective electric vehicle, obtaining a change of the first charge power curve of the respective electric vehicle from the first feedback charge power curve and the first charge power curve of the respective electric vehicle;

S7, judging whether the change of the first charge power curve of the respective electric vehicle is 0;

S8, if yes, charging the respective electric vehicle in accordance with the first charge power curve of the respective electric vehicle; and S9, if no, obtaining a second charge power curve for the respective electric vehicle from the first feedback charge power curve, the change of the first charge power curve and the first charge power curve of the respective electric vehicle, changing m=m+1, and repeating steps S2 to S9 in accordance with the second charge power curve.

2. The method according to claim 1, wherein step S6 comprises:
obtaining a second optimal solution of a second quadratic programming according to formula (3), and the second optimal solution is the change of the first charge power curve of each of the plurality of electric vehicles, $$\min_{\lambda_1^m, \ldots, \lambda_N^m} \omega_1 \sum_{k=0}^{T-1} \left( \sum_{i=1}^{N} (P_i^{m-1}(k) + \Delta P_i^m(k)\lambda_i^m) - D(k) \right)^2 + \quad (3)$$

$$\omega_2 \sum_{i=1}^{N} \sum_{k=0}^{T-1} c_i(k)(P_i^{m-1}(k) + \Delta P_i^m(k)\lambda_i^m)$$

s.t. $0 \leq \lambda_i^m \leq 1$ where $\lambda_i^m$ is the change of the first charge power curve of the i-th electric vehicle, $0 \leq \lambda_i^m \leq 1$ is a second constraint condition of the second quadratic programming.

3. The method according to claim 2, wherein obtaining the second charge power curve of each of the plurality of electric vehicles from the first feedback charge power curve, the change of the first charge power curve and the charge power curve is performed according to formula (4), $$P_i^m = P_i^{m-1} + \lambda_i^m \Delta P_i^m \quad (4)$$

where $P_i^m$ is the second charge power curve of the i-th electric vehicle.

4. The method according to claim 1, wherein the step S3 is performed in each of the plurality of electric vehicles.

5. A system for charging electric vehicles in an aggregation, comprising:
a master controller, configured to obtain a plurality of first charge power curves of a plurality of electric vehicles in the aggregation, and to obtain coordinating information of each of the plurality of electric vehicles from the plurality of first charge power curves, wherein the master controller is configured to:
obtain the coordinating information of each of the plurality of electric vehicles from the plurality of first charge power curves and a plurality of ideal charge power curves according to formula (1), $$\Delta_i^{m-1} = \sum_{j=1, j \neq i}^{N} P_j^{m-1} - D \quad (1)$$

where $\Delta_i^{m-1}$ is the coordinating information of the i-th electric vehicle, $P_j^{m-1}$ is the first charge power curve of the j-th electric vehicle, D is an ideal charge power curve of the aggregation, N is a number of electric vehicles in the aggregation, m is the number of iterations, i, j and m are positive integers greater than 0;

a plurality of sub-controllers, wherein each sub-controller is installed in a respective one of the plurality of electric vehicles, each of the sub-controllers is configured to obtain a first feedback charge power curve of the respective electric vehicle from the coordinating information and a charging cost curve of the respective electric vehicle, and each sub-controller is configured to:
obtain a first optimal solution a first quadratic programming according, to formula (2), and the first optimal solution is the first feedback charge power curve of respective i-th electric vehicle, $$\min_{P_i^{m^*}(0), \ldots, P_i^{m^*}(T-1)} \omega_1 \sum_{k=0}^{T-1} (P_i^{m^*}(k) + \Delta_i^{m-1}(k))^2 + \omega_2 \sum_{k=0}^{T-1} c_i(k) P_i^{m^*}(k) \quad (2)$$

s.t. $g_i(P_i^{m^*}(0), \ldots, P_i^{m^*}(T-1)) \geq 0$ where $\omega_1$ and $\omega_2$ are weight coefficients, $P_i^{m*}$ is the first feedback charge power curve of the i-th electric vehicle, $c_i$ is the charging cost curve of the i-th electric vehicle, k is a period of time, T is the number of periods of time, the first feedback charge power curve of the i-th electric vehicle, the coordinating information of the i-th electric vehicle, and the charging cost curve of the i-th electric vehicle respectively comprise a plurality of components on the period of time 0 to the period of time k, and $g_i(P_i^{m*}(0), \ldots, P_i^{m*}(T-1)) \geq 0$ is a first constraint condition of the first quadratic programming, $g_i(\bullet) \geq 0$ is a multiple linear vector-valued function of the i-th electric vehicle, meaning $E_i(k+1) = E_i(k) + P_i(k)\Delta t \; k=0, \ldots, T-1 \quad (a)$ $\underline{E}_i(k) \leq E_i(k) \leq \tilde{E}_i(k) \; k=1, \ldots, T-1 \quad (b)$ $\underline{P}_i(k) \leq P_i(k) \leq \tilde{P}_i(k) \; k=0, \ldots, T-1 \quad (c)$ $E_i(0) = E_i^0, E_i(T) = E_i^T \quad (d) \quad (1)$ where $E_i(k)$ is a battery energy storage of the i-th electric vehicle in the k-th period of time, $\underline{E}_i(k)$ is a lower limit of $E_i(k)$, $\tilde{E}_i(k)$ is an upper limit of $E_i(k)$, $\underline{P}_i(k)$ is a lower limit of $P_i(k)$, $\tilde{P}_i(k)$ is an upper limit of $P_i(k)$; $E_i^0$ is a battery energy storage of the i-th electric vehicle at the beginning time for charging, $E_i^T$ is a battery energy storage of the electric vehicle at the end time for charging, Δt is a time difference;

the master controller is also configured to:
  judge, for each of the plurality of electric vehicles, whether the first feedback charge power curve of the respective electric vehicle is same as the first charge power curve of the respective electric vehicle;
  if yes, charge each of the plurality of electric vehicles in accordance with the first charge power curve of the respective electric vehicle;
  if no, under the condition that the first feedback charge power curve of the respective electric vehicle is not the same as the first charge power curve of the respective electric vehicle, obtain a change of the first charge power curve of of the respective electric vehicle from the first feedback charge power curve and the first charge power curve of the respective electric vehicle;
  judge whether the change of the first charge power curve of the respective electric vehicle is 0;
  if yes, charge of the respective electric vehicle in accordance with the first charge power curve of the respective electric vehicle; and
  if no, obtain a second charge power curve for the respective electric vehicle from the first feedback charge power curve, the change of the first charge power curve and the first charge power curve of the respective electric vehicle.

6. The system according to claim 5, wherein each sub-controller is configured to:
  obtain a second optimal solution of a second quadratic programming according to formula (3), and the second optimal solution is the change of the first charge power curve of the respective, i-th electric vehicle, $$\min_{\lambda_1^m, \ldots, \lambda_N^m} \omega_1 \sum_{k=0}^{T-1} \left( \sum_{i=1}^{N} (P_i^{m-1}(k) + \Delta P_i^m(k)\lambda_i^m) - D(k) \right)^2 + \omega_2 \sum_{i=1}^{N} \sum_{k=0}^{T-1} c_i(k)(P_i^{m-1}(k) + \Delta P_i^m(k)\lambda_i^m) \quad (3)$$

$$\text{s.t.} \quad 0 \leq \lambda_i^m \leq 1$$

where $\lambda_i^m$ is the change of the first charge power curve of the i-th electric vehicle, $0 \leq \lambda_i^m \leq 1$ is a second constraint condition of the second quadratic programming.

7. The system according to claim 6, wherein each sub-controller is configured to obtain the second charge power curve for the respective electric vehicle from the first feedback charge power curve, the change of the first charge power curve and the charge power curve of the respective electric vehicle according to formula (4), $$P_i^m = P_i^{m-1} + \lambda_i^m \Delta P_i^m \quad (4)$$

where $P_i^m$ is the second charge power curve of the i-th electric vehicle.

8. A non-transitory computer readable storage medium, comprising a computer program for executing by a computer steps of:
  S1, obtaining a plurality of first charge power curves of a plurality of electric vehicles in the aggregation;
  S2, obtaining ft-coordinating information of each of the plurality of electric vehicles from the plurality of first charge power curves, wherein step S2 comprises:
    obtaining the coordinating information of each of the plurality of electric vehicles from the plurality of first charge power curves and a plurality of ideal charge power curves according to formula (1), $$\Delta_i^{m-1} = \sum_{j=1, j \neq i}^{N} P_j^{m-1} - D \quad (1)$$

where $\Delta_i^{m-1}$ is the coordinating information of the i-th electric vehicle, $P_j^{m-1}$ is the first charge power curve of the j-th electric vehicle, D is an ideal charge power curve of the aggregation, N is a number of electric vehicles in the aggregation, m is the number of iterations, i, j and m are positive integers greater than 0;

S3, obtaining a first feedback charge power curve of each of the plurality of electric vehicles from the coordinating information and a charging cost curve of each of the plurality of electric vehicles, wherein step S3 comprises:
    obtaining a first optimal solution of a first quadratic programming according to formula (2), and the first optimal solution for the respective electric vehicle is the first feedback charge power curve of the respective electric vehicle, $$\min_{P_i^{m*}(0), \ldots, P_i^{m*}(T-1)} \omega_1 \sum_{k=0}^{T-1} (P_i^{m*}(k) + \Delta_i^{m-1}(k))^2 + \omega_2 \sum_{k=0}^{T-1} c_i(k) P_i^{m*}(k) \quad (2)$$

$$\text{s.t.} \quad g_i(P_i^{m*}(0), \ldots, P_i^{m*}(T-1)) \geq 0$$

where $\omega_1$ and $\omega_2$ are weight coefficients, $P_i^{m*}$ is the first feedback charge power curve of the i-th electric vehicle, $c_i$ is the charging cost curve of the i-th electric vehicle, k is a period of time, T is the number of periods of time, the first feedback charge power curve of the i-th electric vehicle, the coordinating information of the i-th electric vehicle, and the charging cost curve of the i-th electric vehicle respectively comprise a plurality of components on the period of time 0 to the period of time k, and $g_i(P_i^{m*}(0), \ldots, P_i^{m*}(T-1)) \geq 0$ is a first constraint condition of the first quadratic programming, $g_i(\bullet) \geq 0$ is a multiple linear vector-valued function of the i-th electric vehicle, which is denoted as $$E_i(k+1) = E_i(k) + P_i(k)\Delta t \quad k=0, \ldots, T-1 \, (a)$$

$$\underline{E}_i(k) \leq E_i(k) \leq \tilde{E}_i(k) \quad k=1, \ldots, T-1 \, (b)$$

$$\underline{P}_i(k) \leq P_i(k) \leq \tilde{P}_i(k) \quad k=0, \ldots, T-1 \, (c)$$

$$E_i(0) = E_i^0, E_i(T) = E_i^T \, (d) \quad (1)$$

where $E_i(k)$ is a battery energy storage of the i-th electric vehicle in the k-th period of $E_i(k)$ is a lower limit of $E_i(k)$, $\tilde{E}_i(k)$ is an upper limit of $E_i(k)$, $\underline{P}_i(k)$ is a lower limit of $P_i(k)$, $\tilde{P}_i(k)$ is an upper limit of $P_i(k)$; $E_i^0$ is a battery energy storage of the i-th electric vehicle at the beginning time for charging, $E_i^T$ is a battery energy storage of the i-th electric vehicle at the end time for charging, $\Delta t$ is a time difference;

S4, for each of the plurality of electric vehicles, judging whether the first feedback charge power curve of the respective electric vehicle is same as the first charge power curve of the respective electric vehicle;
  S5, if yes, charging the respective electric vehicle in accordance with the first charge power curve of the respective electric vehicle;

S6, if no, under the condition that the first feedback charge power curve of the respective electric vehicle is not the same as the first charge power curve of the respective electric vehicle, obtaining a change of the first charge power curve of the respective electric vehicle from the first feedback charge power curve and the first charge power curve of the respective electric vehicle;

S7, judging whether the change of the first charge power curve of the respective electric vehicle is 0;

S8, if yes, charging the respective electric vehicle in accordance with the first charge power curve of the respective electric vehicle; and S9, if no, obtaining a second charge power curve for the respective electric vehicle from the first feedback charge power curve, the change of the first charge power curve and the first charge power curve of the respective electric vehicle, changing $m=m+1$, and repeating steps S2 to S9 in accordance with the second charge power curve.

* * * * *